United States Patent
Hart et al.

(10) Patent No.: US 11,525,506 B2
(45) Date of Patent: Dec. 13, 2022

(54) TRANSFER CASE OFF-AXIS PUMP

(71) Applicant: GM GLOBAL TECHNOLOGY OPERATIONS LLC, Detroit, MI (US)

(72) Inventors: James M. Hart, Belleville, MI (US); Daryl A. Wilton, Macomb, MI (US); Clinton E. Carey, Highland, MI (US); Robert B. Parrish, White Lake, MI (US); William M. Modisett, Waterford, MI (US); Keith W. Noser, Birmingham, MI (US); Mark D. Kieliszewski, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 205 days.

(21) Appl. No.: 17/171,897

(22) Filed: Feb. 9, 2021

(65) Prior Publication Data

US 2022/0252146 A1 Aug. 11, 2022

(51) Int. Cl.
*F16H 57/04* (2010.01)
*F16H 57/02* (2012.01)
*F04C 11/00* (2006.01)
*F04C 15/00* (2006.01)

(52) U.S. Cl.
CPC .......... *F16H 57/0441* (2013.01); *F04C 11/00* (2013.01); *F04C 15/0088* (2013.01); *F16H 57/02* (2013.01); *F16H 57/0424* (2013.01); *F16H 57/0436* (2013.01); *F16H 57/0489* (2013.01); *F04C 2240/30* (2013.01); *F04C 2240/60* (2013.01); *F16H 57/0484* (2013.01); *F16H 57/0495* (2013.01); *F16H 2057/02052* (2013.01)

(58) Field of Classification Search
CPC .. F16H 57/0441; F16H 57/02; F16H 57/0424; F16H 54/0436; F16H 57/0489; F16H 2057/02052
USPC ........................................ 74/665 G
See application file for complete search history.

(56) References Cited

U.S. PATENT DOCUMENTS

| | | | |
|---|---|---|---|
| 9,568,091 B2* | 2/2017 | Drill | F16H 57/0473 |
| 10,309,522 B2* | 6/2019 | Palazzolo | B60K 17/35 |
| 10,598,271 B2* | 3/2020 | Warnecke | F16H 57/02 |
| 10,710,453 B2* | 7/2020 | Ryman | F16H 57/0473 |
| 11,091,020 B2* | 8/2021 | Aulin | B60K 6/48 |
| 2016/0160713 A1* | 6/2016 | Reedy | B60K 17/35 184/6.28 |
| 2016/0363201 A1* | 12/2016 | McNally | B60K 17/348 |
| 2017/0158053 A1* | 6/2017 | Bunyan | F16H 57/035 |

* cited by examiner

*Primary Examiner* — Ha Dinh Ho
(74) *Attorney, Agent, or Firm* — Quinn IP Law

(57) ABSTRACT

A transfer case pump includes an oil pump, a cover assembly, and a torque transfer mechanism. The oil pump has a pump shaft, and is configured to pressurize a lubricant in response to a rotation of the pump shaft. The pump shaft rotates around a pump axis. The pump axis is parallel to a rear axis of a rear shaft. The pump axis is offset from the rear axis. The cover assembly has a channel configured to transfer the lubricant from the oil pump to the rear shaft. The cover assembly extends around the rear shaft and around the pump shaft. The torque transfer mechanism is configured to transfer a torque from the rear shaft to the pump shaft.

20 Claims, 4 Drawing Sheets

TRANSFER CASE OFF-AXIS PUMP

The present disclosure relates to a system and a method for a transfer case off-axis pump.

Single-speed transfer cases and two-speed transfer cases implement on-axis transfer case pumps to move lubricants around inside the transfer cases. The rotational speeds of the on-axis transfer case pumps are governed by the speeds of corresponding shafts inside the transfer cases. While the two-speed transfer cases are in a low gear, the internal shafts rotate slowly. Therefore, large on-axis transfer case pumps are implemented in the two-speed transfer cases to maintain minimum lubrication rates. Such on-axis transfer case pumps generally consume up to approximately 250 watts of power at 2,000 revolutions per minute.

What is desired is a technique for a low-power transfer case off-axis pump that is suitable for both single-speed transfer cases and two-speed transfer cases.

SUMMARY

A transfer case pump is provided herein. The transfer case pump includes an oil pump, a cover assembly, and a torque transfer mechanism. The oil pump has a pump shaft, and is configured to pressurize a lubricant in response to a rotation of the pump shaft. The pump shaft rotates around a pump axis. The pump axis is parallel to a rear axis of a rear shaft. The pump axis is offset from the rear axis. The cover assembly has a channel configured to transfer the lubricant from the oil pump to the rear shaft. The cover assembly extends around the rear shaft and around the pump shaft. The torque transfer mechanism is configured to transfer a torque from the rear shaft to the pump shaft.

In one or more embodiments of the transfer case pump, the cover assembly includes an annular oil transfer ring and a pump cover. The annular oil transfer ring is disposed around the rear shaft, and has a first channel configured to transfer the lubricant to the rear shaft. The pump cover extends around the annular oil transfer ring, extends around the pump shaft, and has a second channel configured to transfer the lubricant from the oil pump to the first channel of the annular oil transfer ring.

In one or more embodiments, the transfer case pump includes an anti-rotation tab that couples the annular oil transfer ring to a rear housing, and a fastener that attaches the pump cover to the rear housing.

In one or more embodiments, the transfer case pump includes a cup plug in fluid communication with the channel. The cup plug has an orifice configured to disperse the lubricant from the channel toward a rear housing.

In one or more embodiments of the transfer case pump, the torque transfer mechanism includes a rear gear couplable to the rear shaft, and a pump gear coupled to the pump shaft and configured to engage with the rear gear.

In one or more embodiments of the transfer case pump, a rear housing has an access bore aligned to the pump axis, and the transfer case pump further includes a feature disposed at an end of the pump shaft, accessible through the access bore, and configured to provide rotational alignment of the pump gear to the rear gear.

In one or more embodiments of the transfer case pump, the torque transfer mechanism includes a rear sprocket coupled to the rear shaft, a pump sprocket couple to the pump shaft, and a pump chain disposed around the rear sprocket and the pump sprocket.

In one or more embodiments of the transfer case pump, the transfer case includes a plate clutch, the rear housing includes a rear aperture through which the rear shaft extends outside of the transfer case, and the transfer case pump is disposed between the plate clutch and the rear aperture.

In one or more embodiments, the transfer case pump is part of a transfer case of a vehicle.

A method for lubrication in a transfer case is provided herein. The method includes rotating a rear shaft of the transfer case around a rear axis, and transferring a torque from the rear shaft to a pump shaft of an oil pump with a torque transfer mechanism. The pump shaft rotates around a pump axis. The pump axis is parallel to the rear axis. The pump axis is offset from the rear axis. The method includes pressurizing a lubricant with the oil pump in response to a rotation of the pump shaft, and transferring the lubricant through a channel in a cover assembly from the oil pump to the rear shaft. The cover assembly extends around the rear shaft and around the pump shaft.

In one or more embodiments of the method, the transferring of the lubricant through the channel in the cover assembly includes transferring the lubricant from the oil pump through a second channel of a pump cover into a first channel of an annular oil transfer ring, and transferring the lubricant through the first channel of the annular oil transfer ring to the rear shaft. The annular oil transfer ring is disposed around the rear shaft. The pump cover extends around the annular oil transfer ring and extends around the pump shaft.

In one or more embodiments, the method includes holding the annular oil transfer ring steady relative to a rear housing of the transfer case, and holding the pump cover steady relative to the rear housing.

In one or more embodiments, the method includes dispersing the lubricant from the channel toward a rear housing of the transfer case through an orifice in a cup plug that is in fluid communication with the channel.

In one or more embodiments of the method, the transferring of the torque from the rear shaft to the pump shaft includes rotating a rear gear with the rear shaft, rotating a pump gear with the rear gear, and rotating the oil pump with the pump gear.

In one or more embodiments of the method, the transferring of the torque from the rear shaft to the pump shaft includes rotating a rear sprocket with the rear shaft, moving a pump chain disposed around the rear sprocket and a pump sprocket, and rotating the oil pump with the pump sprocket.

In one or more embodiments of the method, the torque transfer mechanism is disposed between a plate clutch and a rear aperture in a rear housing of the transfer case. The rear shaft extends outside of the transfer case through the rear aperture.

A transfer case is provided herein. The transfer case includes a rear shaft, an oil pump, a cover assembly, and a torque transfer mechanism. The rear shaft is configured to rotate around a rear axis. The oil pump has a pump shaft, and is configured to pressurize a lubricant in response to a rotation of the pump shaft. The pump shaft rotates around a pump axis. The pump axis is parallel to the rear axis. The pump axis is offset from the rear axis. The cover assembly has a channel configured to transfer the lubricant from the oil pump to the rear shaft. The cover assembly extends around the rear shaft and around the pump shaft. The torque transfer mechanism is configured to transfer a torque on the rear shaft to the pump shaft.

In one or more embodiments of the transfer case, the cover assembly includes and annular oil transfer ring and a pump cover. The annular oil transfer ring is disposed around the rear shaft, and has a first channel configured to transfer the lubricant from the pump cover to the rear shaft. The pump cover that extends around the annular oil transfer ring, extends around the pump shaft, and has a second channel configured to transfer the lubricant from the oil pump to the first channel of the annular oil transfer ring.

In one or more embodiments, the transfer case includes a rear housing, and a cup plug in fluid communication with the channel. The cup plug has an orifice configured to disperse the lubricant from the channel toward the rear housing.

In one or more embodiments, the transfer case includes a rear housing that has a rear aperture through which the rear shaft extends outside of the transfer case, and a plate clutch. The torque transfer mechanism is disposed between the plate clutch and the rear aperture.

The above features and advantages and other features and advantages of the present disclosure are readily apparent from the following detailed description of the best modes for carrying out the disclosure when taken in connection with the accompanying drawings.

DETAILED DESCRIPTION

Embodiments of the disclosure provide low-loss, off-axis transfer case pumps for pressurizing lubricants inside transfer cases of four-wheel drive vehicles. The transfer case pumps are suitable for implementation in both single-speed transfer cases and two-speed transfer cases. The transfer cases are coupled to transmissions and configured to distribute torque from the transmissions to front differentials and rear differentials of the vehicles.

In various embodiments, the transfer case pumps may be integrated with rear housings of the transfer cases and subsequently coupled to rear shafts of the transfer cases during assembly. In other embodiments, the transfer case pumps may be integrated with rear shafts of the transfer cases and enclosed by the rear housings during assembly. The transfer case pumps incorporate gear-driven torque transfer mechanisms or chain-driven torque transfer mechanisms to provide torque from the rear shafts to the transfer case pumps. Anti-chucking of the chain-driven torque transfer mechanisms may be achieved with snap rings. Pump shafts of the transfer case pumps are oriented parallel to, and offset from corresponding rear shafts in the transfer cases.

Oil pumps within the transfer cases support integral oil outlets to feed the lubricants under pressure into channels within the transfer cases. The channels direct the lubricants to the rear shafts, and in some cases, toward the rear areas of the transfer cases. Integral oil baffles and/or shields may be provided to maintain lubrication levels while the vehicles are on ground sloped uphill and/or downhill. In various designs, the cover assemblies may be integral devices or two-part devices. In the two-part designs, energized ring seals maintain the lubricant inside the channels while under pressure. For some designs of the transfer cases, assembly access plugs and access bores are provided in the rear housings. The access bores permit tools to be coupled to features on the pump shafts during assembly. The tools are used to twist the gears in the torque transfer mechanism so that the gears mesh and rotationally align when the two gears are initially brought together.

Based on gear ratios or sprocket ratios in the torque transfer mechanism, the oil pumps may rotate faster, slower, or at the same speeds as the rear shafts. Overdriving the oil pumps allows for smaller pump diameters. The small diameter oil pumps are more efficient than large diameter oil pumps. Flexibility in the gear/sprocket ratios also enables the transfer case pumps to use a common design in both the single-speed transfer cases and the two-speed transfer cases.

Figure 1:
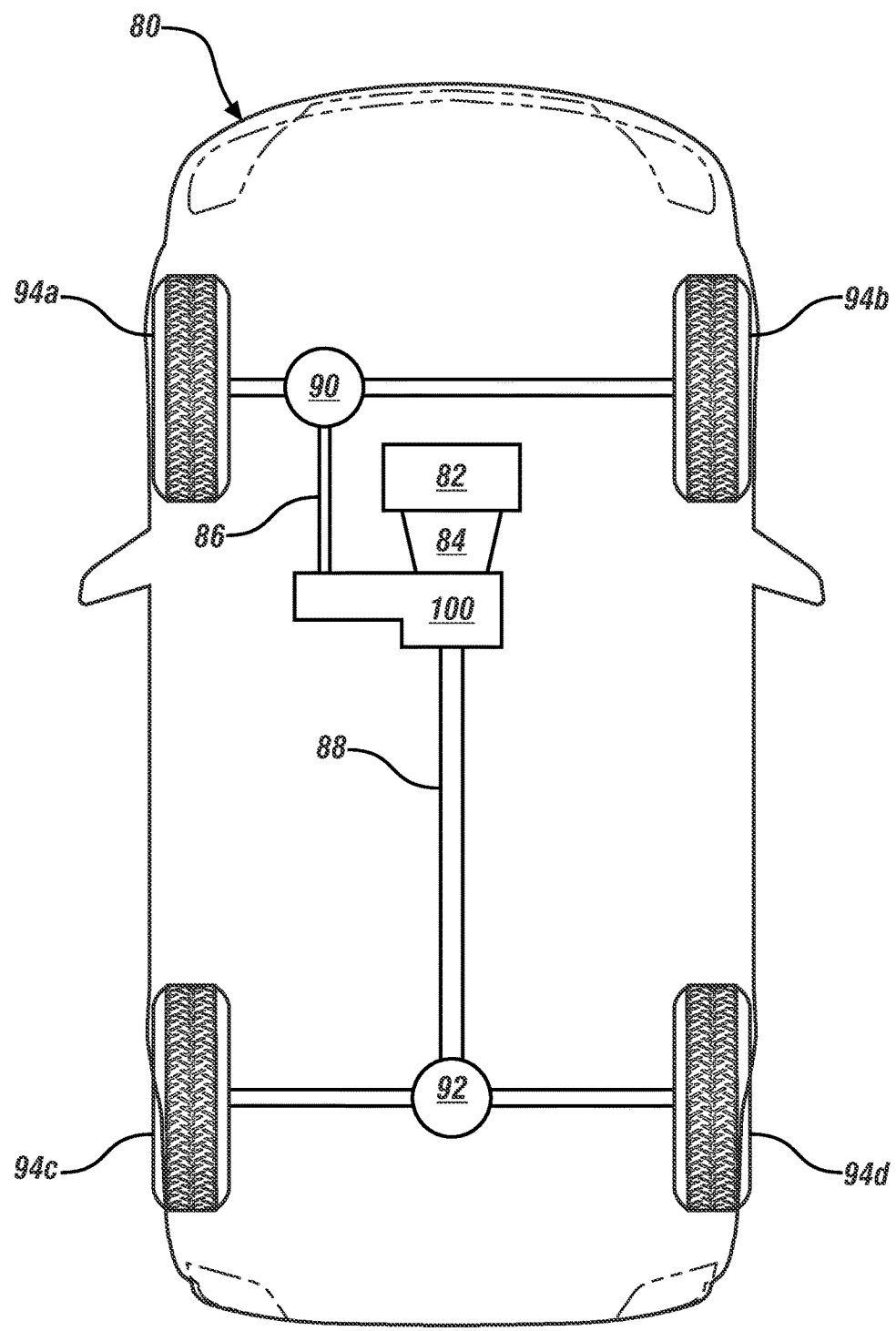
FIG. 1 is a schematic diagram illustrating a context of a vehicle in accordance with one or more exemplary embodiments.

Referring to FIG. 1, a schematic diagram illustrating a context of a vehicle 80 is shown in accordance with one or more exemplary embodiments. The vehicle 80 generally includes an engine 82, a transmission 84, a front driveshaft 86, a rear driveshaft 88, a front differential 90, a rear differential 92, multiple wheels 94a-94d, and a transfer case 100.

The vehicle 80 implements an automobile (or car). In various embodiments, the vehicle 80 may include, but is not limited to, a passenger vehicle, a truck, an autonomous vehicle, a gas-powered vehicle, an electric-powered vehicle, a hybrid vehicle, a recreational vehicle and/or an off-road vehicle. Other types of vehicles 80 may be implemented to meet the design criteria of a particular application.

The engine 82 implements a motor for the vehicle 80. In various embodiments, the engine 82 may include, but is not limited to, a gasoline-powered engine, a hybrid gas/electric engine, or an electric motor. Other types of engines 82 may be implemented to meet the design criteria of a particular application.

The transmission 84 implements a multi-speed transmission. The transmission 84 is coupled to the engine 82. In various embodiments, the transmission 84 include several (e.g., three to ten) forward gear ratios, a neutral condition, a park condition, and one or more reverse gear ratios.

The front driveshaft 86 and the rear driveshaft 88 are configured to transfer rotational power from the transfer case 100 to the front differential 90 and the rear differential 92, respectively. The front differential 90 is configured to transfer the torque from the front driveshaft 86 to the front wheels (e.g., 94a and 94b). The rear differential 92 is configured to transfer the torque from the rear driveshaft 88 to the rear wheels (e.g., 94c and 94d).

The wheels 94a-94d implement road wheels. The wheels 94a-94d are generally configured to provide for support and movement of the vehicle 80 across the ground. In various embodiments, each wheel 94a-94d may include a tire mounted on a rim. The wheels 94a-94d may be used to provide traction between the vehicle 80 and the ground upon which the vehicle 80 is sitting.

The transfer case 100 implements a single-speed or a multiple-speed (e.g., two-speed) transfer case. The transfer case 100 is coupled to the transmission 84 to receive an input torque. The transfer case 100 is operational to direct the input torque from the transmission 84 to the front driveshaft 86 and the rear driveshaft 88. In two-speed transfer case designs, the transfer case 100 may be operational to drive the front driveshaft 86 and the rear driveshaft 88 at the same rotational speed or a lower rotational speed than an output shaft of the transmission 84. In some embodiments, the transfer case 100 may be controlled to deliver the input torque to the front driveshaft 86 or the rear driveshaft 87, but not both.

The transfer case 100 may include a dog clutch that enables the front driveshaft 86 and the rear driveshaft 88 to be uncoupled from the transmission 84. By way of example, a four-wheel drive vehicle 80 may be towed in a dinghy towing mode with the rear wheels rolling on the ground (e.g., towed behind another vehicle or a recreational vehicle). While in the dinghy towing mode, the transmission 84 is placed in park and the transfer case 100 is placed in neutral. By implementing a transfer case pump in a downstream position relative to a reduction planetary gearset within the transfer case 100, the transfer case pump may operate with power received from at least the rear wheels. Therefore, the transfer cases maintain proper lubrication while the vehicle 80 is being towed in the dinghy towing mode.

Figure 2:
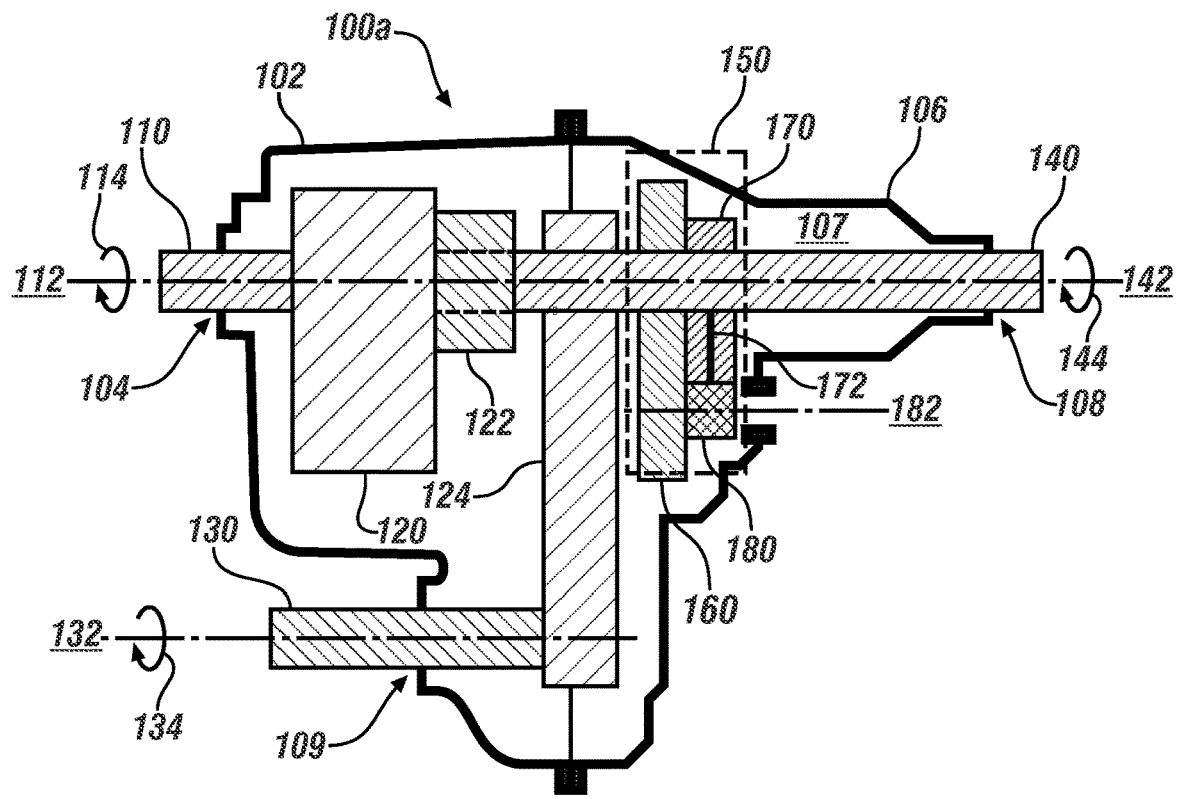
FIG. 2 is a schematic cross-sectional diagram of a transfer case in accordance with an exemplary embodiment.

Referring to FIG. 2, a schematic cross-sectional diagram of an example implementation of a transfer case 100a is shown in accordance with an exemplary embodiment. The transfer case 100a may be a variation of the transfer case 100 shown in FIG. 1. The transfer case 100a implements a multiple-speed (e.g., two-speed) transfer case.

The transfer case 100a generally includes a front housing 102, an input aperture 104 in the front housing 102, a rear housing 106, a rear aperture 108 in the rear housing 106, a front aperture 109 in the front housing 102, an input shaft 110, a planetary gearset 120, a plate clutch 122, a drive chain and sprocket assembly 124, a front shaft 130, a rear shaft 140, a transfer case pump 150, and a torque transfer mechanism 160. The transfer case pump 150 includes a cover assembly 170, a channel 172 in the cover assembly 170, and an oil pump 180.

The input shaft 110 is coupled to the transmission 84 and the planetary gearset 120. The input shaft 110 extends through the front housing 102 through the input aperture 104. The input shaft 110 is configured to rotate around an input axis 112. The input shaft 110 receives an input torque 114 from the transmission 84.

The front shaft 130 is coupled to the front driveshaft 86 and the drive chain and sprocket assembly 124. The front shaft 130 extends through the front housing 102 through the front aperture 109. The front shaft 130 is configured to rotate around a front axis 132. The front shaft 130 delivers a front torque 134 to the front wheels 94a and 94b through the front driveshaft 86 and the front differential 90.

The rear shaft 140 is coupled to the rear driveshaft 88, the plate clutch 122, and the transfer case pump 150. The rear shaft 140 extends through the rear housing 106 through the rear aperture 108. The rear shaft 140 is configured to rotate around a rear axis 142. In various embodiments, the rear axis 142 is aligned with the input axis 112. The rear shaft 140 delivers a rear torque 144 to the rear wheels 94c and 94d through the rear driveshaft 88 and the rear differential 92.

The planetary gearset 120 is coupled to the input shaft 110 and the rear shaft 140. The planetary gearset 120 implements an adjustable multiple-speed (e.g., two-speed) mechanism and the dog clutch. The planetary gearset 120 is operational to transfer the input torque 114 from the input shaft 110 to the rear shaft 140 at multiple (e.g., two) selectable gear ratios (e.g., a low gear ratio is referred to as a high-range mode and is used for normal highway driving, and a high gear ratio is referred to as a low-range mode and is used for increased torque and reduced speed driving). The dog clutch is operational to alternatively couple and uncouple the planetary gearset from the rear shaft 140. While in an engaged mode, the dog transfers torque to the rear shaft 140. While in a neutral mode, the dog clutch isolates the torque from the rear shaft 140.

The plate clutch 122 is coupled to the drive chain and sprocket assembly 124 and the rear shaft 140. The plate clutch 122 is operational to couple and uncouple the drive chain and sprocket assembly 124 from the rear shaft 140. While engaged, the plate clutch 122 transfers a variable amount of torque from the rear shaft 140 to the drive chain and sprocket assembly 124. While disengaged, the plate clutch 122 isolates the drive chain and sprocket assembly 124 from the torque available on the rear shaft 140.

The drive chain and sprocket assembly 124 is coupled to the plate clutch 122 and the front shaft 130. The drive chain and sprocket assembly 124 is configured to transfer the torque from the rear shaft 140, through the plate clutch 122 and subsequently to the front shaft 130. Based on the torque transmitted by the plate clutch 122 to the drive chain and sprocket assembly 124, the front torque 134 may be greater, smaller, or the same as the rear torque 144.

The transfer case pump 150 is operational to pressurize a lubricant and transfer the lubricant to the rear shaft 140 and around the inside of the transfer case 100a. In various embodiments, the transfer case pump 150 is operational to direct the lubricant toward a rear area 107 of the transfer case 100a. The rear area 107 may span between the transfer case pump 150 and the rear aperture 108.

The torque transfer mechanism 160 implements a gear-based torque transfer mechanism and/or a chain-based torque transfer mechanism. As a gear-base torque transfer mechanism 160, multiple (e.g., two or more) gears are used to transfer torque from the rear shaft 140 to the oil pump 180. As a chain-based torque transfer mechanism 160, a chain coupled to multiple (e.g., two) sprockets conveys torque from the rear shaft 140 to the oil pump 180.

The cover assembly 170 implements a single-piece assembly or a multiple (e.g., two) piece assembly. The cover assembly extends around the rear shaft 140 and around a pump shaft of the oil pump 180. The cover assembly 170 is configured to direct the lubricant through the channel 172 from the oil pump 180 to the rear shaft 140. In various embodiments, the cover assembly 170 may also be configured to direct the lubricant from the channel 172 toward the rear area 107 of the transfer case 100a.

The oil pump 180 is operational to pressurize the lubricant available inside the transfer case 100a. The oil pump 180 subsequently directs the pressurized lubricant into the cover assembly 170 for distribution. The oil pump 180 rotates around a pump axis 182. The pump axis 182 is parallel to the rear axis 142 of a rear shaft 140. The pump axis 182 is offset from the rear axis 142 of the rear shaft 140 by a fixed distance.

Figure 3:
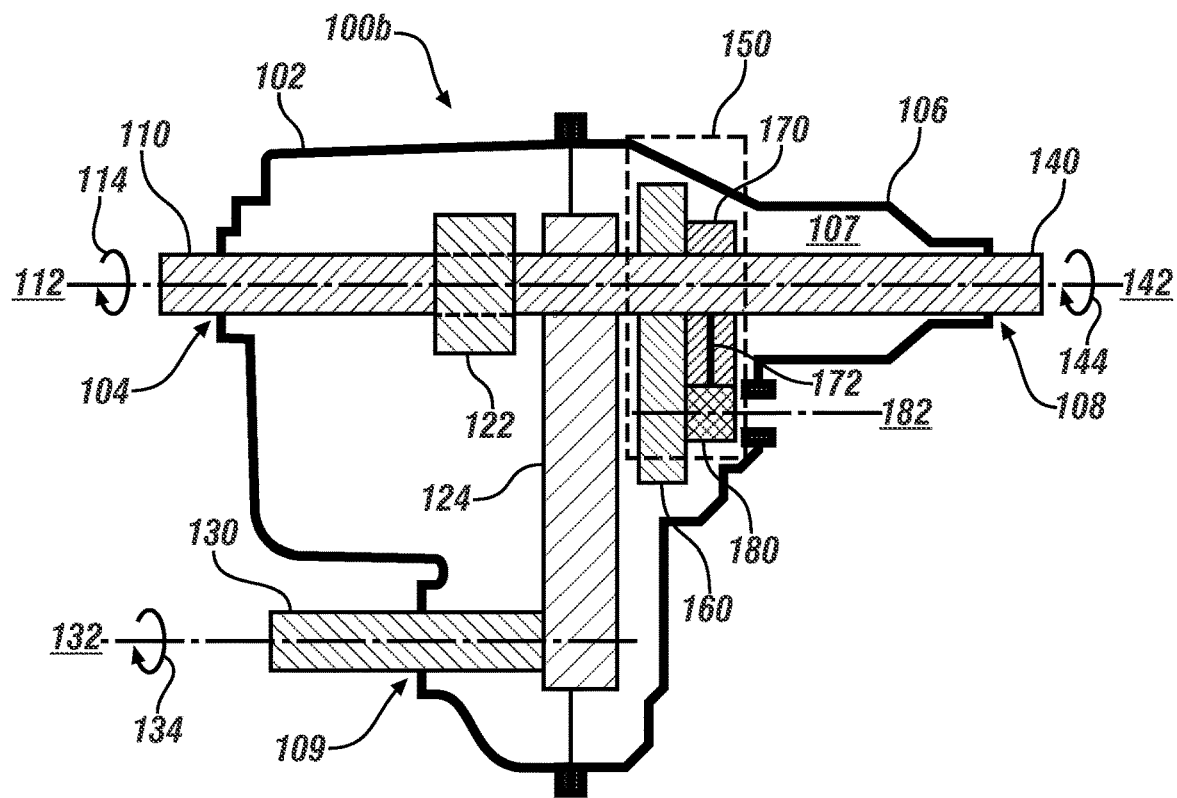
FIG. 3 is a schematic cross-sectional diagram of another transfer case in accordance with an exemplary embodiment.

Referring to FIG. 3, a schematic cross-sectional diagram of an example implementation of another transfer case 100b is shown in accordance with an exemplary embodiment. The transfer case 100b may be a variation of the transfer case 100a shown in FIG. 2 and/or the transfer case 100 shown in FIG. 1. The transfer case 100b implements a single-speed transfer case.

The transfer case 100b generally includes the front housing 102, the input aperture 104 in the front housing 102, the rear housing 106, the rear aperture 108 in the rear housing 106, the front aperture 109 in the front housing, the input shaft 110, the plate clutch 122, the drive chain and sprocket assembly 124, the front shaft 130, the rear shaft 140, the transfer case pump 150, and the torque transfer mechanism 160. The rear housing 106 generally includes porting a pump inlet and outlet.

In the single-speed transfer case 100b, the input shaft 110 is connected directly to the rear shaft 140. In various embodiments, the input shaft 110 may be extended. In other embodiments, an extension shaft may be installed to effectively lengthen the input shaft 110. The single-speed transfer case 100b is operational in the same manner as the multiple-speed transfer case 100a while the planetary gearset 120 in the multiple-speed transfer case 100a is in the high-range mode. In the absence of the planetary gearset 120 in the single-speed transfer case 100b, the single-speed transfer case 100b does not include the low-range mode nor the neutral mode where the rear shaft 140 is disconnected from the input shaft 110.

Figure 4:
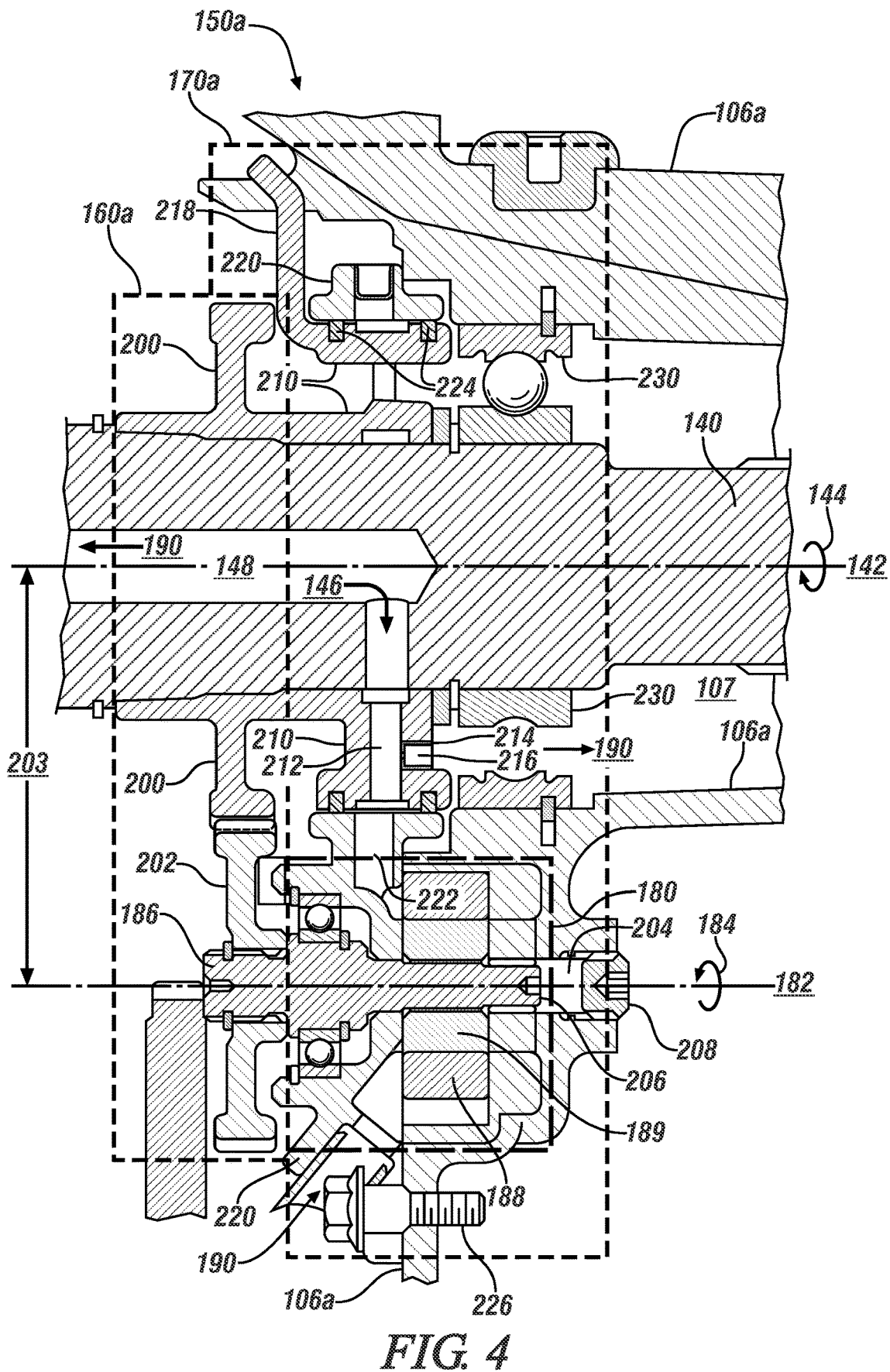
FIG. 4 is a schematic cross-sectional diagram of a transfer case pump in accordance with one or more exemplary embodiments.

Referring to FIG. 4, a schematic cross-sectional diagram of an example implementation of a transfer case pump 150a is shown in accordance with one or more exemplary embodiments. The transfer case pump 150a may be a variation of the transfer case pump 150 shown in FIGS. 2 and 3. The transfer case pump 150a may be integrated with a rear housing 106a during assembly. The rear housing 106a may be a variation of the rear housing 106 shown in FIGS. 2 and 3.

The transfer case pump 150a generally includes a torque transfer mechanism 160a, a cover assembly 170a and an oil pump 180. The torque transfer mechanism 160a may be a gear-based version of the torque transfer mechanism 160 shown in FIGS. 2 and 3. The cover assembly 170a may be a two-piece variation of the cover assembly 170 shown in FIGS. 2 and 3.

The rear shaft 140 includes an oil inlet 146 in fluid communication with an oil passage 148. The oil inlet 146 receives the lubricant 190 from the cover assembly 170a. The oil inlet 146 transfers the lubricant 190 to the oil passage 148. The oil passage 148 is generally centered around the rear axis 142. The oil passage 148 is configured to direct the lubricant 190 to other components coupled to and/or near the rear shaft 140.

The torque transfer mechanism 160a generally includes a rear gear 200 and a pump gear 202. The rear gear 200 is coupled to the rear shaft 140 and configured to rotate with the rear shaft 140. The pump gear 202 is coupled to a pump shaft 186 of the oil pump 180 and configured to rotate with the pump shaft 186. The rear gear 200 and the pump gear 202 engage each other such that the rear gear 200 transfers torque to the pump gear 202. In various embodiments, a gear geometry of the rear gear 200 and the pump gear 202 may implement a spur geometry, a helical geometry, or a double-helical geometry. Other geometries may be implemented to meet the design criteria of a particular application.

A rotational speed of the rear shaft 140 is generally no higher than several thousand (e.g., approximately 4,200) revolutions per minute. Hence, existing oil pump designs operate below a "high speed fill limit." An advantage may be taken by overdriving the oil pump 180 with the torque transfer mechanism 160a to further reduce losses and still meet lubrication criterion. An underdrive/overdrive ratio in a range of approximately 0.8:1 to approximately 1.8:1 may be achieved at reasonable gear center distances 203. A gear pitch radius of the rear gear 200 is in a range of approximately 32 millimeters (mm) to approximately 52 mm (e.g., 42.5 mm). A gear pitch radius of the pump gear 202 is in a range of approximately 18 mm to approximately 38 mm (e.g., 28.5 mm). A gear center distance 203 between the center of the rear gear 200 (e.g., the rear axis 142) and the center of the pump gear 202 (e.g., the pump axis 182) may be in a range of approximately 54 mm to approximately 84 mm (e.g., 69 mm). For example, a gear ratio of 42.5 mm radius (rear gear 200) to 28.5 mm radius (pump gear 202) at a 69 mm gear center distance 203 produces approximately a 1.6:1 ratio. Implementing a small gear center distance 203 generally reduces mass and windage of the rear gear 200 and the pump gear 202. Other overdrive ratios and/or the gear center distances 203 may be implemented to meet a design criteria of a particular application.

A highest lubrication demand for the transfer case 100a generally exists in trucks operating in the low-range mode. In the low-range mode, an output rotational speed of the rear shaft 140 is less than half the input rotational speed of the input shaft 110. The planetary gearset 120 is active in the low-range mode yielding a high lubrication criteria to preserve active planetary pinions. In contrast, some trucks implement the single-speed transfer case 100b and so do not have the low-range mode. For commonality between the two-speed transfer cases 100a and the single-speed transfer cases 100b, a flexible strategy may be employed in the gear-based torque transfer mechanism 160a. The strategy implements a high overdrive in the two-speed transfer cases 100a and a potential underdrive in the single-speed transfer cases 100b by virtue of changing the gear ratio between the rear gear 200 and the pump gear 202. For example, at a 90 mm gear center distance 203, a gear ratio option of 0.9:1 may be implemented to underdrive single-speed transfer cases 100b. A gear ratio option of 1.8:1 may be implemented to overdrive two-speed transfer cases 100a. The remainder of the components in the transfer cases 100a and 100b, other than an effective length of the input shaft 110, may remain unchanged.

One or both gears 200 and 202 may be made of powdered metal, aluminum, bronze, cast iron, or the like. To reduce noise, one or both gears 200 and 202 may be made of non-metal material. For example, one or both gears 200 and 202 may be fabricated from polyether ether ketone (PEEK) or similar thermoplastic polymer. Pressures of the lubricants 190 within the transfer cases 100/100a/100b are on the order of 500 kilo-Pascals (kPa). In contrast, lubrication pumps in the transmission 84 generally operate at 2,100 kPa. Experimental testing indicates that gears fabricated from PEEK material are capable of the lower stress applications in the transfer cases 100/100a/100b. Other materials may be utilized to meet the design criteria of a particular application.

The cover assembly 170a implements a two-part assembly. A first part of the cover assembly 170a includes an annular oil transfer ring 210 having a first channel 212, a cup plug 214 having an orifice 216, and an anti-rotation tab 218. A second part of the cover assembly 170a includes a pump cover 220 having a second channel 222. Multiple cover seals 224 are disposed in grooves in the annular oil transfer ring 210.

The annular oil transfer ring 210 is disposed around an outer circumference of the rear shaft 140 and is coupled to the pump cover 220. An inner diameter of the annular oil transfer ring 210 seals metal-to-metal to an outer diameter of the rear shaft 140. A fluid connection is established between the first channel 212 of the annular oil transfer ring 210 and the oil inlet 146. The first channel 212 is also in fluid communication with the second channel 222 of the pump cover 220 to receive the lubricant 190 from the oil pump 180.

The cup plug 214 is in fluid communication with the first channel 212. The orifice 216 in the cup plug 214 is configured to disperse the lubricant 190 from the first channel 212 toward the rear area 107 of the rear housing 106a. The orifice 216 helps regulate lubrication to components in the rear area 107 of the transfer case 100/100a/100b. The components include, but are not limited to, output ball bearings, bushings, and seals. The orifice 216 also helps maintains lubrication during downhill vehicle operation. A clocking location of cup plug 214 may be tuned to establish a head height of lubrication feed.

The anti-rotation tab 218 extends from the annular oil transfer ring 210 to engage with the rear housing 106a. The anti-rotation tab 218 is configured to prevent the annular oil transfer ring 210 from rotating due to friction with the rear shaft 140.

The pump cover 220 is configured to couple the oil pump 180 to the annular oil transfer ring 210. The pump cover 220 is fastened to rear housing 106a and spans two axes (e.g., the rear axis 142 and the pump axis 182). The pump cover 220 includes an aperture in which portions of the oil pump 180 reside, and another aperture (e.g., a round opening) that surrounds the annular oil transfer ring 210. The second channel 222 transfers the lubricant 190 from the oil pump 180 to the first channel 212 of the annular oil transfer ring 210. The pump cover 220 also provides a dam feature at the interface with annular oil transfer ring 210 and the rear housing 106a. The dam feature maintains the lubricant 190 from transferring between the rear area 107 and a front area of the transfer case 100/100a/100b.

The cover seals 224 are configured to seal the first channel 212 to the second channel 222 thereby preventing leaks of the lubricant 190. The cover seals 224 also provide for a radial tolerance allowance between the outside diameter of the annular oil transfer ring 210 and an inside diameter of a corresponding aperture in the pump cover 220. Since both the annular oil transfer ring 210 and the pump cover 220 are coupled to the rear housing 106a, no active rotation exists at seal interfaces. The cover seals 224 may be fabricated from Teflon, Torlon, Vespel, PEEK, and the like. Alternatively, O-rings may be used with some adjustment to the groove width. A fastener 226 (e.g., a bolt) is configured to secure the pump cover 220 to the rear housing 106a.

The oil pump 180 generally includes a pump shaft 186 and a gerotor gear pair 188-189. The pump shaft 186 rotates around the pump axis 182. The pump axis 182 is parallel to the rear axis 142 of the rear shaft 140. The pump axis 182 is offset from the rear axis 142 by the gear center distance 203. The pump shaft 186 is configured to couple the inner gerotor gear 189 to the pump gear 202 to receive a pump torque 184. The pump shaft 186 includes a feature 206 (e.g., a drive hex feature) that provides for manual rotation during assembly. The pump torque 184 rotates the gerotor gear pair 188-189 to pressurize the lubricant 190.

During assembly of a transfer case 100/100a/100b, the oil pump 180 may be inserted into a pocket machined into rear housing 106a. The fastener 226 subsequently secures the oil pump 180 to the rear housing 106a. The rear gear 200, the annular oil transfer ring 210, and an unshielded bearing 230 are attached to the rear shaft 140 before the rear housing 106a is mated to the front housing 102. The cover seals 224 are applied to the annular oil transfer ring 210. With the annular oil transfer ring 210 aligned to the corresponding aperture in the pump cover 220, the rear shaft 140 and the rear housing 106a, with the attached oil pump 180, are moved relative to each other to bring the rear housing 106a into contact with the front housing 102. The rear housing 106a includes an access bore 204 aligned with the pump axis 182. As the rear gear 200 engages the pump gear 202, a tool (not shown) may be inserted into the access bore 204 to engage the feature 206 at the closest end of the pump shaft 186. The tool is used to wiggle (or rotate) the pump shaft 186 and the pump gear 202 so that the pump gear 202 aligns and meshes with the rear gear 200. The front housing 102 and the rear housing 106a are subsequently attached to each other to close the transfer case 100/100a/100b. After the tool is removed from the access bore 204, an access plug 208 is inserted into the access bore 204 to seal the opening.

Figure 5:
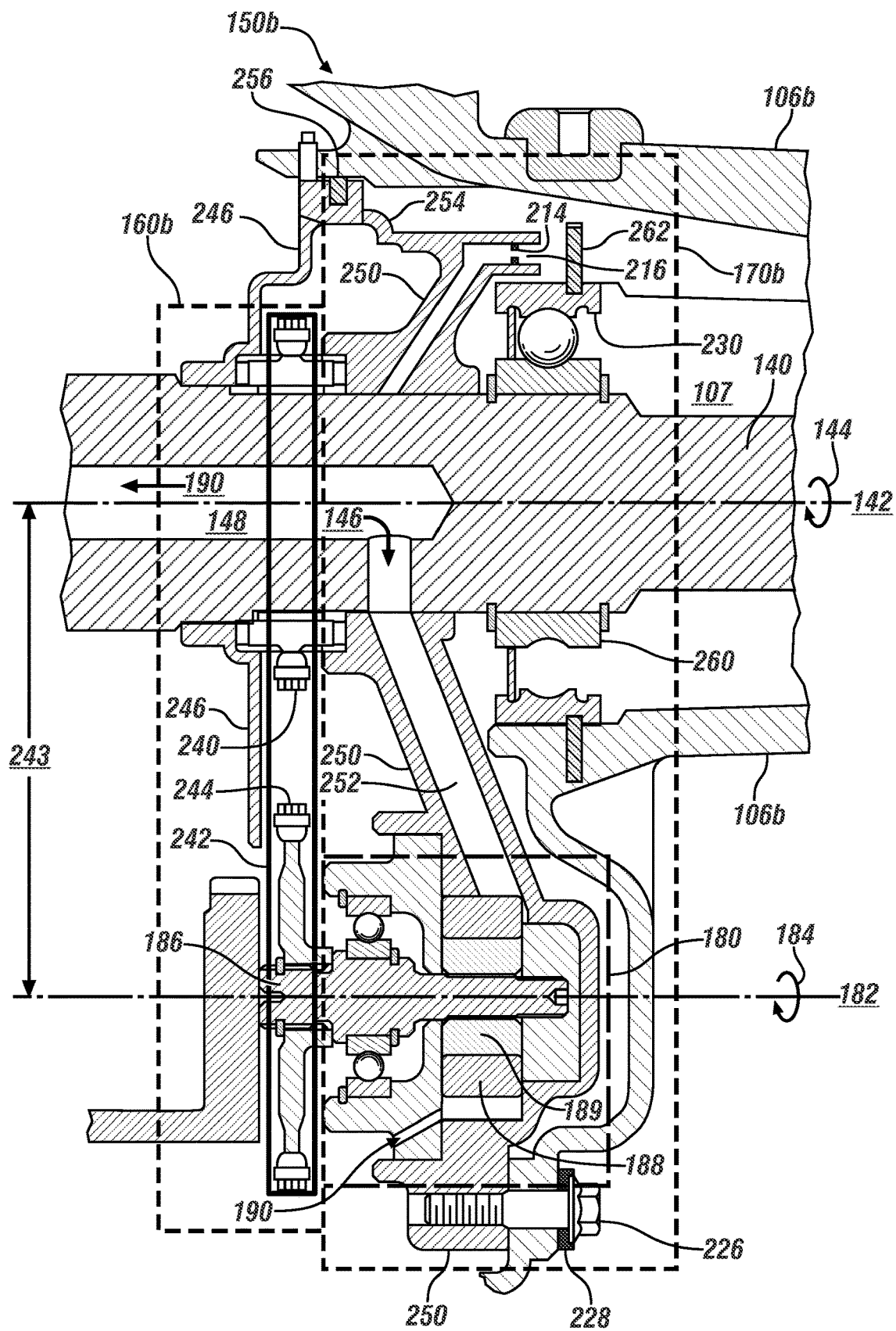
FIG. 5 is a schematic cross-sectional diagram of another transfer case pump in accordance with one or more exemplary embodiments.

Referring to FIG. 5, a schematic cross-sectional diagram of an example implementation of a transfer case pump 150b is shown in accordance with one or more exemplary embodiments. The transfer case pump 150b may be a variation of the transfer case pump 150 shown in FIGS. 2 and 3 and/or the transfer case pump 150a shown in FIG. 4. The transfer case pump 150b may be coupled to the rear shaft 140 before a rear housing 106b is installed during assembly. The rear housing 106b may be a variation of the rear housing 106 shown in FIGS. 2 and 3 and/or the rear housing 106a shown in FIG. 4.

The transfer case pump 150b generally includes a torque transfer mechanism 160b, a cover assembly 170b and the oil pump 180. The torque transfer mechanism 160b may be a chain-based version of the torque transfer mechanism 160 shown in FIGS. 2 and 3. The cover assembly 170b may be a single-piece variation of the cover assembly 170 shown in FIGS. 2 and 3.

The oil inlet 146 of the rear shaft 140 is in fluid communication with the cover assembly 170b to receive the lubricant 190.

The torque transfer mechanism 160b generally includes a rear sprocket 240 and a pump sprocket 244. The rear sprocket 240 is coupled to the rear shaft 140 and configured to rotate with the rear shaft 140. The pump sprocket 244 is coupled to the pump shaft 186 of the oil pump 180 and configured to rotate with the pump shaft 186. A chain 242 engages the rear sprocket 240 and the pump sprocket 244 to transfer torque from the rear shaft 140 to the pump shaft 186.

The chain-base torque transfer mechanism 160b may have the same advantages as the gear-based torque transfer mechanism 160a in that the oil pump 180 may be underdriven or overdriven based on the radii of the rear sprocket 240 and the pump sprocket 244. An underdrive/overdrive ratio in a range of approximately 0.8:1 to approximately 1.8:1 may be achieved at reasonable chain center distances 243. A radius of the rear sprocket 240 is in a range of approximately 32 mm to approximately 52 mm (e.g., 42.5 mm). A radius of the pump sprocket 244 is in a range of approximately 18 mm to approximately 38 mm (e.g., 28.5 mm). The chain center distance 243 between the center of the rear sprocket 240 (e.g., the rear axis 142) and the center of the pump sprocket 244 (e.g., the pump axis 182) may be in a range of approximately 54 mm to approximately 84 mm (e.g., 69 mm).

As with the transfer case 100a, the highest lubrication demand for the transfer case 100b generally exists in trucks operating in the low-range mode. For commonality between the two-speed transfer cases 100a and the single-speed transfer cases 100b, the flexible strategy may be employed in the chain-based torque transfer mechanism 160b. The strategy implements a high overdrive in the two-speed transfer cases 100a and a potential underdrive in the single-speed transfer cases 100b by virtue of changing the ratio between the rear sprocket 240 and the pump sprocket 244. For example, at a 90 mm chain center distance 243, the ratio option of 0.9:1 may be implemented to underdrive single-speed transfer cases 100b. The ratio option of 1.8:1 may be implemented to overdrive two-speed transfer cases 100a.

The remainder of the components in the transfer cases 100a and 100b, other than an effective length of the input shaft 110, may remain unchanged.

One or both sprocket 240 and 244 may be made of powdered metal, aluminum, bronze, cast iron, or the like. Other materials may be utilized to meet the design criteria of a particular application.

The cover assembly 170b implements a one-part integrated assembly. The cover assembly 170b includes an integral cover 250, an angled channel 252, and a support 254. An aperture of the integral cover 250 is disposed around an outer circumference of the rear shaft 140 and is coupled to the oil pump 180. An inner diameter of the aperture of the integral cover 250 seals metal-to-metal to the outer diameter of the rear shaft 140. A fluid connection is established between the angled channel 252 and the oil inlet 146. The angled channel 252 is also in fluid communication with the oil pump 180 to receive the lubricant 190.

The cup plug 214 is in fluid communication with the angled channel 252. The orifice 216 in the cup plug 214 is configured to disperse the lubricant 190 from the angled channel 252 toward the rear area 107 of the rear housing 106b. The orifice 216 helps regulate lubrication to components in the rear area 107 of the transfer case 100/100a/100b. A deflector 262 may be located near the cup plug 214 in downstream of the dispersed lubricant 190. The components include, but are not limited to, output ball bearings, bushings, and seals. A clocking location of cup plug 214 may be tuned to establish a head height of lubrication feed.

The support 254 extends from the integral cover 250 to engage with the rear housing 106b. The support 254 engages the rear housing 106b using a snap ring 256. The support 254 and the snap ring 256 are configured to prevent the integral cover 250 from moving laterally along the rear axis 142. The support 254 and the snap ring 256 are also configured to prevent the integral cover 250 from rotating due to friction with the rear shaft 140. The snap ring 256 may help prevent chucking of integral cover 250 relative to rear housing 106b.

The fastener 226 attaches the integral cover 250 to the rear housing 106b. A hole in the rear housing 106b that accepts the fastener 226 is oversized relative to a diameter of the fastener 226 to account for tolerances. The fastener 226 also prevents lateral movement and rotation of the integral cover 250. A pad 228 is disposed between a head of the fastener 226 and the rear housing 106b. The pad 228 generally secures the lower half of the transfer case pump 150b from rattling, rocking, and other types of movement.

The integral cover 250 is configured to couple the oil pump 180 to the rear shaft 140. The integral cover 250 is fastened to rear housing 106b and spans two axes (e.g., the rear axis 142 and the pump axis 182). The integral cover 250 includes an aperture in which portions of the oil pump 180 reside, and another aperture (e.g., a round opening) that surrounds the rear shaft 140. The angled channel 252 transfers the lubricant 190 from the oil pump 180 to the rear shaft 140. The integral cover 250 provides a dam feature at the interfaces with the rear shaft 140 and the rear housing 106b. The dam feature maintains the lubricant 190 from transferring between the rear area 107 and a front area of the transfer case 100/100a/100b.

The oil pump 180 generally includes the pump shaft 186 and the gerotor pump gears 188-189. The pump shaft 186 rotates around the pump axis 182. The pump axis 182 is parallel to the rear axis 142 of the rear shaft 140. The pump axis 182 is offset from the rear axis 142 by the chain center distance 243. The pump shaft 186 is configured to couple the inner gerotor pump gear 189 to the pump gear 202 to receive the pump torque 184. The pump torque 184 rotates the gerotor gear pair 188-189 to pressurize the lubricant 190.

An oil baffle 246 is included adjacent to the torque transfer mechanism 160b. The oil baffle 246 is secured to support with a snap ring and castle joint combination. A shielded bearing 260 is disposed adjacent to the integral cover 250. A shield on a side of bearing 260 facing the integral cover 250 holds the lubricant 190 in the rear area 107 of transfer case 100/100a/100b for adequate downhill grade lubrication.

During assembly of a transfer case 100/100a/100b, the rear sprocket 240, the oil pump 180, and the shielded bearing 260 are attached to the rear shaft 140 before the rear housing 106b is mated to the front housing 102. The snap ring 256 is applied to a groove in the integral cover 250. The rear housing 106b and the rear shaft 140 with the attached oil pump 180 are moved relative to each other to bring the rear housing 106b into contact with the front housing 102. The front housing 102 and the rear housing 106b are subsequently attached to each other to close the transfer case 100/100a/100b. Afterwards, the fastener 226 and the pad 228 are used to attach the integral cover 250 to the rear housing 106b.

Various embodiments of the transfer case 100/100a/100b generally provide reduced drag, reduced carbon dioxide emissions and/or better fuel economy for the vehicle 80. The oil pump 180 may consume as little as approximately 20 watts at 2,000 revolutions per minute. The low power consumption may reduce carbon dioxide emissions by approximately 1-2 grams/mile.

While the best modes for carrying out the disclosure have been described in detail, those familiar with the art to which this disclosure relates will recognize various alternative designs and embodiments for practicing the disclosure within the scope of the appended claims.

What is claimed is:

1. A transfer case pump comprising:
   an oil pump that has a pump shaft, and is configured to pressurize a lubricant in response to a rotation of the pump shaft, wherein the pump shaft rotates around a pump axis, the pump axis is parallel to a rear axis of a rear shaft, and the pump axis is offset from the rear axis;
   a cover assembly that has a channel configured to transfer the lubricant from the oil pump to the rear shaft, wherein the cover assembly extends around the rear shaft and around the pump shaft; and
   a torque transfer mechanism configured to transfer a torque from the rear shaft to the pump shaft.

2. The transfer case pump according to claim 1, wherein the cover assembly comprises:
   an annular oil transfer ring disposed around the rear shaft, and has a first channel configured to transfer the lubricant to the rear shaft; and
   a pump cover that extends around the annular oil transfer ring, extends around the pump shaft, and has a second channel configured to transfer the lubricant from the oil pump to the first channel of the annular oil transfer ring.

3. The transfer case pump according to claim 2, further comprising:
   an anti-rotation tab that couples the annular oil transfer ring to a rear housing; and
   a fastener that attaches the pump cover to the rear housing.

4. The transfer case pump according to claim 1, further comprising:

a cup plug in fluid communication with the channel, wherein the cup plug has an orifice configured to disperse the lubricant from the channel toward a rear housing.

5. The transfer case pump according to claim 1, wherein the torque transfer mechanism comprises:
a rear gear couplable to the rear shaft; and
a pump gear coupled to the pump shaft and configured to engage with the rear gear.

6. The transfer case pump according to claim 5, wherein a rear housing has an access bore aligned to the pump axis, the transfer case pump further comprising:
a feature disposed at an end of the pump shaft, accessible through the access bore, and configured to provide rotational alignment of the pump gear to the rear gear.

7. The transfer case pump according to claim 1, wherein the torque transfer mechanism comprises:
a rear sprocket coupled to the rear shaft;
a pump sprocket couple to the pump shaft; and
a pump chain disposed around the rear sprocket and the pump sprocket.

8. The transfer case pump according to claim 1, wherein the transfer case includes a plate clutch, the rear housing includes a rear aperture through which the rear shaft extends outside of the transfer case, and the transfer case pump is disposed between the plate clutch and the rear aperture.

9. The transfer case pump according to claim 1, wherein the transfer case pump is part of a transfer case of a vehicle.

10. A method for lubrication in a transfer case comprising:
rotating a rear shaft of the transfer case around a rear axis;
transferring a torque from the rear shaft to a pump shaft of an oil pump with a torque transfer mechanism, wherein the pump shaft rotates around a pump axis, the pump axis is parallel to the rear axis, and the pump axis is offset from the rear axis;
pressurizing a lubricant with the oil pump in response to a rotation of the pump shaft; and
transferring the lubricant through a channel in a cover assembly from the oil pump to the rear shaft, wherein the cover assembly extends around the rear shaft and around the pump shaft.

11. The method according to claim 10, wherein the transferring of the lubricant through the channel in the cover assembly comprises:
transferring the lubricant from the oil pump through a second channel of a pump cover into a first channel of an annular oil transfer ring; and
transferring the lubricant through the first channel of the annular oil transfer ring to the rear shaft, wherein the annular oil transfer ring is disposed around the rear shaft, and the pump cover extends around the annular oil transfer ring and extends around the pump shaft.

12. The method according to claim 11, further comprising:
holding the annular oil transfer ring steady relative to a rear housing of the transfer case; and
holding the pump cover steady relative to the rear housing.

13. The method according to claim 10, further comprising:
dispersing the lubricant from the channel toward a rear housing of the transfer case through an orifice in a cup plug that is in fluid communication with the channel.

14. The method according to claim 10, wherein the transferring of the torque from the rear shaft to the pump shaft comprises:
rotating a rear gear with the rear shaft;
rotating a pump gear with the rear gear; and
rotating the oil pump with the pump gear.

15. The method according to claim 10, wherein the transferring of the torque from the rear shaft to the pump shaft comprises:
rotating a rear sprocket with the rear shaft;
moving a pump chain disposed around the rear sprocket and a pump sprocket; and
rotating the oil pump with the pump sprocket.

16. The method according to claim 10, wherein the torque transfer mechanism is disposed between a plate clutch and a rear aperture in a rear housing of the transfer case, and the rear shaft extends outside of the transfer case through the rear aperture.

17. A transfer case comprising:
a rear shaft configured to rotate around a rear axis;
an oil pump that has a pump shaft, and is configured to pressurize a lubricant in response to a rotation of the pump shaft, wherein the pump shaft rotates around a pump axis, the pump axis is parallel to the rear axis, and the pump axis is offset from the rear axis;
a cover assembly that has a channel configured to transfer the lubricant from the oil pump to the rear shaft, wherein the cover assembly extends around the rear shaft and around the pump shaft; and
a torque transfer mechanism configured to transfer a torque on the rear shaft to the pump shaft.

18. The transfer case according to claim 17, wherein the cover assembly comprises:
an annular oil transfer ring disposed around the rear shaft, and has a first channel configured to transfer the lubricant from the pump cover to the rear shaft; and
a pump cover that extends around the annular oil transfer ring, extends around the pump shaft, and has a second channel configured to transfer the lubricant from the oil pump to the first channel of the annular oil transfer ring.

19. The transfer case according to claim 17, further comprising:
a rear housing; and
a cup plug in fluid communication with the channel, wherein the cup plug has an orifice configured to disperse the lubricant from the channel toward the rear housing.

20. The transfer case according to claim 17, further comprising:
a rear housing that has a rear aperture through which the rear shaft extends outside of the transfer case; and
a plate clutch, wherein the torque transfer mechanism is disposed between the plate clutch and the rear aperture.

* * * * *